US012651499B2

(12) United States Patent
    Slagel

(10) Patent No.: US 12,651,499 B2
(45) Date of Patent: Jun. 9, 2026

(54) USER ACCOUNTABILITY RESTROOM

(71) Applicant: PORTABLE SOLUTIONS GROUP, LLC, Wurtland, KY (US)

(72) Inventor: Robert Rhett Slagel, Ironton, OH (US)

(73) Assignee: PORTABLE SOLUTIONS GROUP, LLC, Wurtland, KY (US)

( * ) Notice: Subject to any disclaimer, the term of this patent is extended or adjusted under 35 U.S.C. 154(b) by 152 days.

(21) Appl. No.: 18/499,803

(22) Filed: Nov. 1, 2023

(65) Prior Publication Data
    US 2024/0153331 A1      May 9, 2024

Related U.S. Application Data

(60) Provisional application No. 63/382,367, filed on Nov. 4, 2022.

(51) Int. Cl.
    *G07C 9/25*          (2020.01)
    *G06V 40/16*         (2022.01)
    *G06V 40/20*         (2022.01)
    *H04N 23/611*        (2023.01)
(52) U.S. Cl.
    CPC .......... *G07C 9/253* (2020.01); *G06V 40/172* (2022.01); *G06V 40/20* (2022.01); *H04N 23/611* (2023.01)
(58) Field of Classification Search
    CPC .... G06V 40/172; G06V 40/20; H04N 23/611; G07C 9/253
    See application file for complete search history.

(56) References Cited

U.S. PATENT DOCUMENTS

| | | | |
|---|---|---|---|
| 2,817,091 A | 12/1957 | Painter | |
| 2,817,846 A | 12/1957 | Stift | |
| 5,111,626 A | 5/1992 | Fortune | |
| 7,638,165 B2 * | 12/2009 | Jensen Moller ..... | C09D 191/06 |
| | | | 106/11 |
| 8,927,265 B2 | 1/2015 | Hansen et al. | |
| 9,771,730 B2 | 9/2017 | Matejka | |
| 10,185,921 B1 * | 1/2019 | Heller ...................... | G07C 9/38 |
| 10,743,728 B2 | 8/2020 | Nelson | |
| 10,822,784 B2 | 11/2020 | Schomburg et al. | |
| 11,166,600 B2 | 11/2021 | Blevins et al. | |
| 2003/0210140 A1 | 11/2003 | Menard et al. | |
| 2005/0044616 A1 | 3/2005 | Brown et al. | |

(Continued)

OTHER PUBLICATIONS

Seattle Department of Transportation, "Port of Seattle Terminal 18 Bathroom Facility Study 2016 Study Update", pp. 78, (Jun. 30, 2015).

(Continued)

*Primary Examiner* — Zhubing Ren
(74) *Attorney, Agent, or Firm* — DLA PIPER LLP US

(57)                ABSTRACT

A deployable restroom may include individually accessible—and access controlled—restroom units. That is, only authorized users identified using electronic readers and/or face detection cameras may be allowed to access the restroom units. For each access, the identification of the user and the corresponding time stamps may be recorded such that there is an accurate access log of who accessed a restroom unit and when—thereby keeping all users identifiable and accountable. One or more security perimeter cameras may continuously monitor the surroundings to complement or augment the access log.

20 Claims, 13 Drawing Sheets

(56)  References Cited

U.S. PATENT DOCUMENTS

| 2011/0316703 | A1* | 12/2011 | Butler ................... | G08B 21/245 |
| | | | | 340/573.1 |
| 2015/0246575 | A1* | 9/2015 | Green ..................... | B44C 1/105 |
| | | | | 156/64 |
| 2018/0181794 | A1* | 6/2018 | Benini ................... | G06V 40/18 |
| 2020/0077243 | A1* | 3/2020 | Heller ................... | H04W 12/64 |
| 2021/0261163 | A1 | 8/2021 | Ohno et al. | |
| 2023/0228143 | A1* | 7/2023 | Stern ...................... | E05B 17/10 |
| | | | | 49/27 |

OTHER PUBLICATIONS

Ibsnetwork, URL: https://theisbnetwork.org/become-a-member/, pp. 8, printed Oct. 18, 2022.
Kure Beach Village, "Access Key/Card for pools, beach gate, bathrooms, cabana & clubhouse", pp. 2, (Apr. 2021).
National Construction Resntals, "Portable Restroom Trailer Rentals—Chicago" pp. 5. (2022).
Toilitech, Prefabricated Toilet-SAM, pp. 5, (2015-2017).

* cited by examiner

100

100

$\underline{100}$

100

124

100

100

136

124

134

100

FRESH WATER
POTABLE WATER ONLY

WASTE WATER

128

134

130

100

$\underline{100}$

202

300

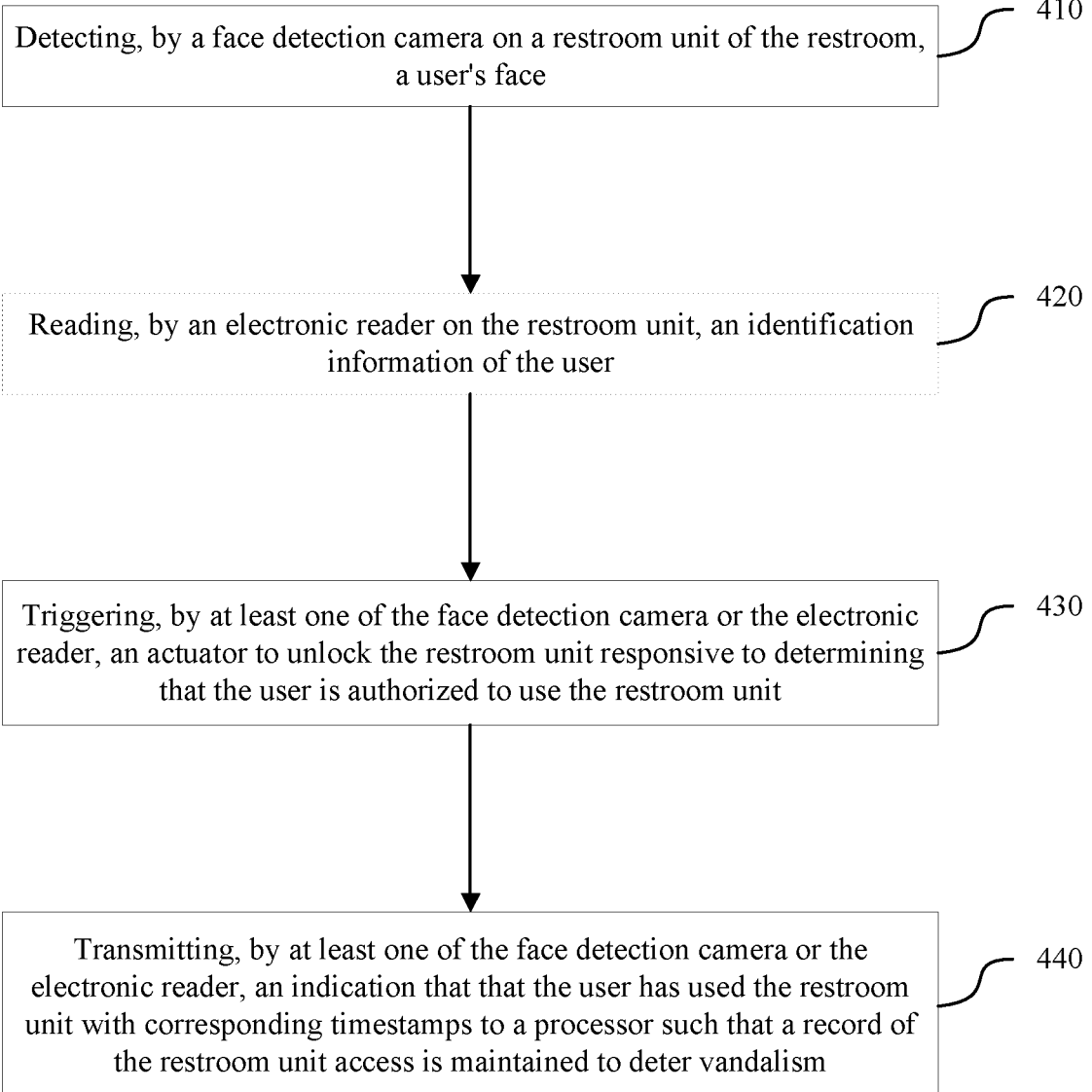

410 — Detecting, by a face detection camera on a restroom unit of the restroom, a user's face 420 — Reading, by an electronic reader on the restroom unit, an identification information of the user 430 — Triggering, by at least one of the face detection camera or the electronic reader, an actuator to unlock the restroom unit responsive to determining that the user is authorized to use the restroom unit 440 — Transmitting, by at least one of the face detection camera or the electronic reader, an indication that that the user has used the restroom unit with corresponding timestamps to a processor such that a record of the restroom unit access is maintained to deter vandalism

USER ACCOUNTABILITY RESTROOM

CROSS REFERENCE TO RELATED APPLICATIONS

This application claims priority to U.S. Provisional Application No. 63/382,367, filed Nov. 4, 2022, which is hereby incorporated in its entirety by reference.

FIELD

This disclosure is directed toward deployable restrooms that impose user accountability by tracking of individual usage of the restrooms and implementing anti-vandalism features.

BACKGROUND

Restrooms are, by definition, private spaces. This privacy, however, allows for certain individuals to engage in racially motivated vandalism such as racial graffiti and/or other visual signs of bias. This has been an increasing problem over the years, particularly in deployable restrooms at jobsites, such as construction sites.

In addition to this conduct being despicable and hurtful, there are other socioeconomic repercussions. Construction and other sites may have to be completely shut down after racially motivated vandalism or incidents are discovered. For example, when graffiti or other signs of bias on jobsites are discovered, the discovery triggers anti-bias response plans, including preserving the site for further investigation. The following is a review of a few recent examples. A datacenter construction site in Altoona, Iowa was shut down in June 2020 when a noose was found on the site. In September 2022, a datacenter construction in Sapry, Utah was temporarily suspended when racist graffiti was found on site. In August 2020, there was racist graffiti in a portable bathroom in a datacenter construction site in New Albany, Ohio—triggering a temporary suspension of the construction and anti-bias training was required for everyone at the construction site. These shutdowns obviously affect the paychecks of the workers and slow down the construction project. Additionally, construction jobs are inherently dangerous, trust becomes the premium capital; and hate incidents such as these erode the trust between the workers themselves and also between the workers and management.

In view of these and other events, construction companies have implemented programs such as construction inclusion weeks. These programs, while always welcome and consistently positive, are remedial measures. Avoiding the racist, biased, hateful content altogether at the first place is more desirable.

As conventional deployable restrooms, such as those in these construction sites, are typically not monitored and publicly accessible, any individual on the site can access them. These persons generally believe they are free to destroy and/or otherwise vandalize the restrooms because they know that they will not be held accountable for their actions—as their identities are not known. As discussed above, the acts of vandalism are personally offensive and economically detrimental. All of these instances are undesirable.

Accordingly, there is a need and desire for a method of holding restroom users accountable for their actions in the restrooms and for a method of preemptively deterring users from vandalizing the restrooms.

SUMMARY

Embodiments disclosed herein solve the aforementioned problems and may provide other solutions as well. In one or more embodiments, a deployable restroom may include individually accessible—and access controlled—restroom units. That is, only authorized users identified using electronic readers and/or face detection cameras may be allowed to access the restroom units. For each access, the identification of the user and the corresponding time stamps may be recorded such that there is an accurate access log of who accessed a restroom unit and when thereby keeping all users identifiable and accountable. One or more security perimeter cameras may continuously monitor the surroundings to complement or augment the access log.

Additionally, the deployable restroom may have internal anti-vandalism measures. For example, a camera may take a snapshot of the internal area of a restroom unit when the user has unlocked, but not entered the restroom unit. The camera may further take another snapshot after the user has exited the restroom unit. These snapshots may be compared to determine whether the user was involved in vandalism, such as e.g., writing graffiti on the walls. Additionally, the internal walls may be painted with anti-graffiti paint as an extra measure of security against vandalism and offensive content.

In an embodiment, a deployable, user-accountable anti-vandalism restroom may be provided. The restroom may comprise a cluster of individually accessible restroom units. A restroom unit may comprise a face detection camera, and an electronic reader. The face detection camera may be configured to detect a user's face. The electronic reader may be configured to read an identification information of the user. At least one of the face detection camera or the electronic reader may further be configured to trigger an actuator to unlock the restroom unit by determining that the user is authorized to use the restroom unit and transmit an indication that that the user has used the restroom unit with corresponding timestamps to a processor such that a record of the restroom unit access is maintained to deter vandalism. In one or more embodiments, the units may comprise an interior wall with anti-graffiti paint.

In an embodiment, a method to mitigate vandalism in a user-accountable deployable restroom is provided. The method may comprise: detecting, by a face detection camera on a restroom unit of the restroom, a user's face. The method may also comprise reading, by an electronic reader on the restroom unit, identification information of the user. The method may further comprise triggering, by at least one of the face detection camera or the electronic reader, an actuator to unlock the restroom unit responsive to determining that the user is authorized to use the restroom unit. The method may additionally comprise transmitting, by at least one of the face detection camera or the electronic reader, an indication that that the user has used the restroom unit with corresponding timestamps to a processor such that a record of the restroom unit access is maintained to deter vandalism.

BRIEF DESCRIPTION OF THE DRAWINGS

The drawings are presented to illustrate various aspects of the principles disclosed herein. As the purpose is merely illustration, the drawings are not to be considered limiting. FIGS. 1A-1I show an example deployable restroom configured to mitigate vandalism, based on the principles disclosed herein.

FIG. 4 is a flowchart of an example method of mitigating vandalism in a deployable restroom, based on the principles disclosed herein.

DESCRIPTION

The disclosed embodiments relate to and provide a user accountability restroom. In one example, the restroom is a modular, access controlled restroom with a cluster of multiple restroom units. The restroom is delivered to a construction or job site as is, providing an access controlled restroom for construction workers on the site. Access to individual restroom units is limited by an electronic reader and/or face detection camera; and there may be no combined access to multiple restroom units. The secured access is designed to deter a user from defacing or vandalizing the unit because the user's identity and the time of use is known.

Although the embodiments disclosed herein are described in terms of deployable restrooms engineered from and into shipping containers, these embodiments are merely for illustration and ease of explanation and should not be considered limiting. The principles disclosed herein can be applied to any kind of deployable restroom, including but not limited to porta potties, rapid deployment military restrooms, temporary restrooms in the field, permanent restrooms in buildings and/or the like. Regardless of the type of restroom physical infrastructure, embodiments disclosed herein may keep users accountable while maintaining an expectation of privacy within the restroom.

Figure 1A:
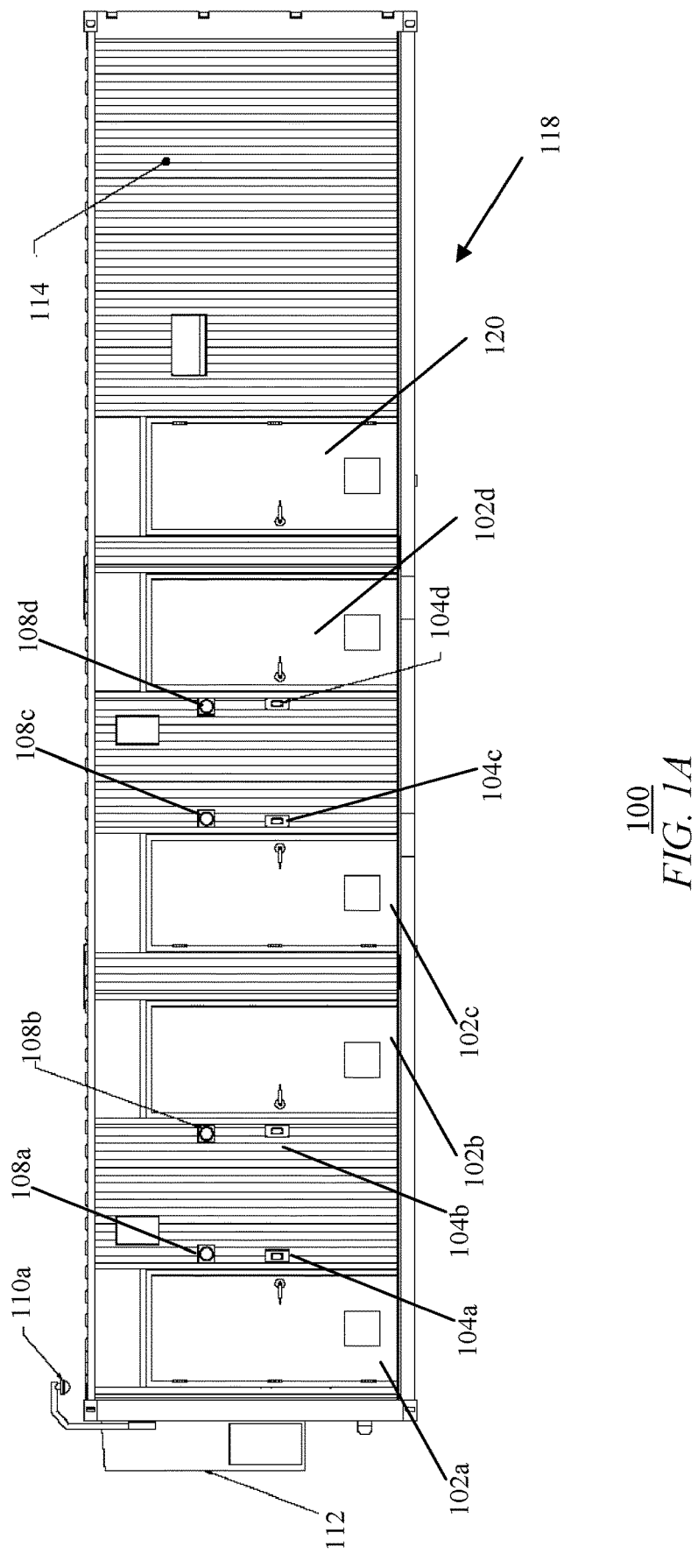
Figure 1B:
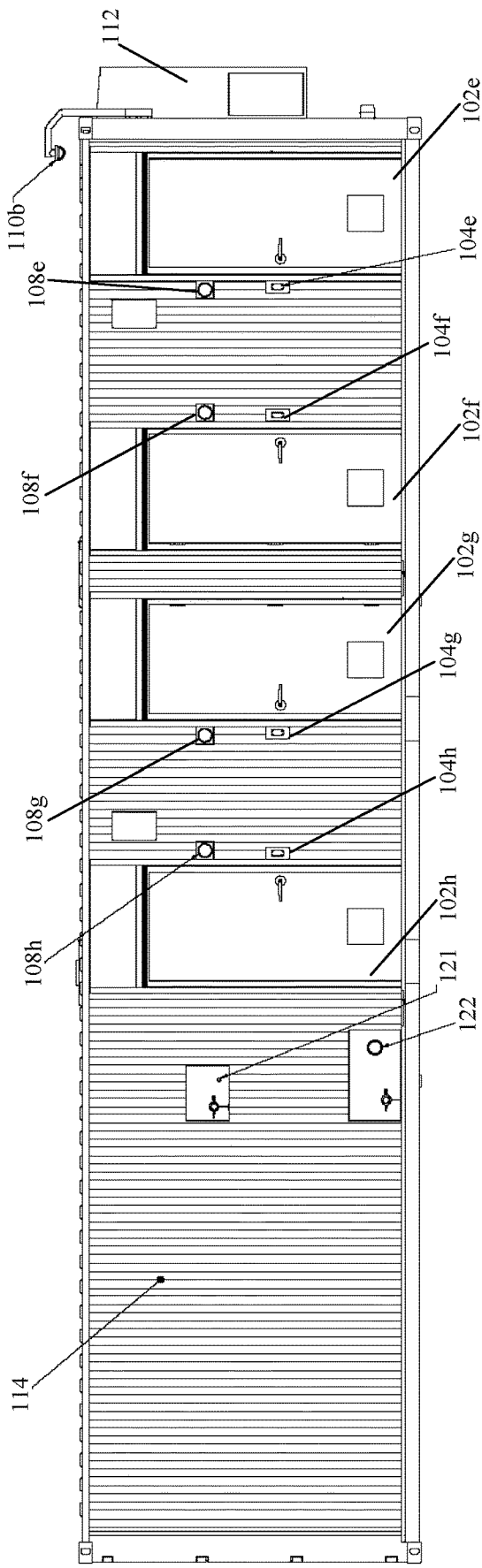
Figure 1C:
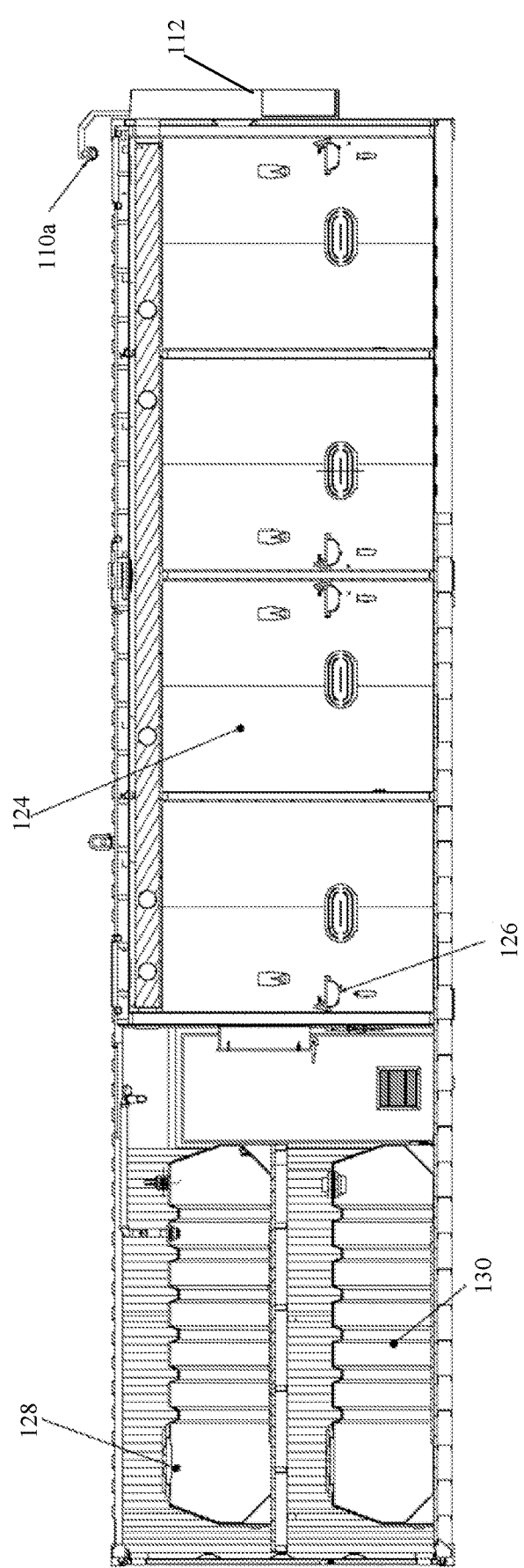
Figure 1D:
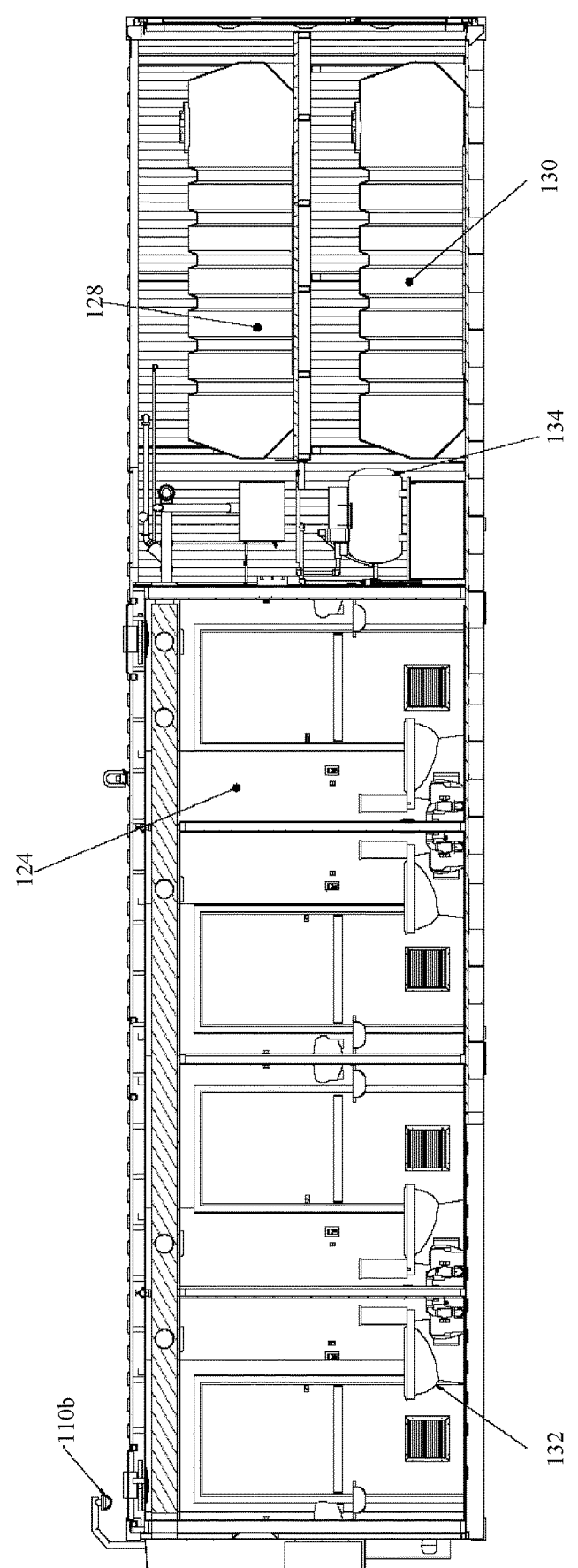

FIGS. 1A-1I show an example deployable restroom 100 based on the principles disclosed herein. The deployable restroom 100 may be deployed at any site, including but not limited to, construction sites, parades, outdoor concerts, political gatherings, and/or the like. In the figures, FIG. 1A shows a front view, FIG. 1B shows a back view, FIGS. 1C-1D show cross section views along the length of the restroom 100, FIGS. 1E-1H show cross section views along the width of the restroom 100, and FIG. 1I shows a top view.

As shown in FIGS. 1A-1B, the deployable restroom 100 may be engineered from and into a shipping container 118, which is simply an example form factor. The form factor of the shipping container 118 may allow for an easy transportation of the deployable restroom 100 by truck and for setting it on the ground at the site of deployment. The deployable restroom 100 may include multiple toilet, urinal, and/or shower facilities organized into multiple restroom units. For instance, eight restroom units 102a-102g (collectively referred to as restroom units 102 and commonly referred to as a restroom unit 102) are shown. This number of restroom units 102, however, is just an example and should not be considered limiting.

Each restroom unit 102 may be associated with one of electronic readers 104a-104h (collectively referred to as electronic readers 104 and commonly referred to as an electronic reader 104) In one or more embodiments, the electronic readers 104 may include card readers that may receive information stored in an identification card, e.g., through tapping, swiping, touching, and/or any other type of contact mechanism, and allow authorized users (e.g., with a valid identification card) to access the corresponding restroom units 102. Additionally, the electronic readers 104 may transmit the access information to a database (shown in FIG.

3 and described below) that may maintain the access log to the restroom units 102. In one or more embodiments, the electronic readers 104 may include optical readers that may optically read identification information from a two-dimensional code such as a bar code, QR code, and/or any other type of code. In one or more embodiments, the electronic readers 104 may use communication technology such as Bluetooth, near field communication (NFC), etc., to read identification information from the user's electronic device such as a smartphone or a smartwatch. Generally speaking, the electronic readers 104 can be any type of device that can read any form of information from any type of card and/or electronic device carried by the user.

Each restroom unit 102 may also be associated with one of face detection cameras 108a-108h (collectively referred to as face detection cameras 108 and commonly referred to as a face detection camera 108). The face detection cameras 108 may take pictures and detect faces of the users in the vicinity of the corresponding restroom units 102.

It should be noted that a restroom unit 102 with an electronic reader 104 and a face detection camera 108 is just an example and should not be considered limiting. In one or more embodiments, a restroom unit 102 may have an electronic reader 104 or a face detection camera 108. That is, restroom units 102 with just a face detection camera 108 (and not an electronic reader 104) and just an electronic reader 104 (and not a face detection camera 108) should also be considered within the scope of this disclosure.

Furthermore, as the electronic card readers 104 and face detection cameras 108 are just examples, the embodiments disclosed herein apply to other types of biometric access as well. For example, the embodiments can be applied to fingerprints, retinal scan, hand geometry, and/or any other type of access to the restroom units 102; in addition to or in lieu of the electronic card readers 104 and/or the face detection cameras 108.

One or more of the electronic readers 104 and the face detection cameras 108 may determine whether the detected users are authorized to use the corresponding restroom units 102. For instance, an electronic reader 104 may compare—either locally or in conjunction with a remote server—the captured identification information with stored identification information to determine whether the corresponding user is authorized to access the restroom unit 102. For instance, the stored identification information may include a whitelist of users allowed to access the restroom unit 102, and only those users are allowed access. Therefore, general members of the public may not access the restroom unit 102.

Similarly, the face detection cameras 108 may detect the faces of the users and determine whether the detected users are authorized to use to the corresponding restroom units 102. For instance, a detected face may be compared with a stored record of faces—and if there is a match, the corresponding user is allowed to access the restroom unit 102. Such comparison may be performed locally at the deployable restroom 100 or remotely in conjunction with a remote server.

The authorizations using the electronic readers 104 and the face detection cameras 108 may be use as alternates or complements to each other. The alternate usage may be based on a fail-safe principle: for example, the electronic readers 104 may be used as default authorization mechanism, and should they fail, the face detection cameras 108 may be used as a back-up. The complementary usage may include having an authorization by one of the devices (e.g., electronic readers 104) confirmed by the other device (e.g., face detection cameras 108).

When a user is authorized for accessing a particular restroom unit 102, a lock may be triggered to open. The trigger may be sent from the electronic readers 104 and/or the face detection cameras 108 directly to the lock. Alternatively, the electronic readers 104 and/or the face detection cameras 108 may provide captured data to a processor—within the deployable restroom or at a remote location—that may then transmit the trigger to the lock. Once the lock is opened, the user may enter the corresponding restroom unit 102. There may be internal monitoring to detect whether the user engages in vandalism while protecting the privacy of restroom use, which is described below with respect to FIG. 2.

A time stamp associated with the user entering the restroom unit 102 may be stored, either locally within the deployable restroom 100 or at a remote server. The corresponding electronic reader 104 and/or the corresponding face detection camera 108 may transmit the timestamp to a processor—either local or remote—and the processor may store the time stamp at an associated database to keep an accurate access log. An example processor and an example database are described below with respect to FIG. 3.

Another time stamp may be generated when the user leaves the restroom unit 102. For instance, when the user steps out of the restroom unit 102—e.g., as detected by a proximity or motion sensor described below with respect to FIG. 2—the restroom unit 102 may automatically lock itself and send a signal to the processor. The processor may then store the time stamp of the locking operation, i.e., the user leaving the restroom, such that there is an accurate log of the duration of the user's usage of the restroom unit 102. Proximity sensors or the motion sensors may be used to curb user behavior trying to trick the system by opening the door and closing it back to mimic an exit from the restroom unit 102.

Security perimeter cameras 110a, 110b (collectively referred to as security perimeter cameras 110 and commonly referred to as a security perimeter camera 110) may continuously or semi-continuously capture a live feed of the perimeter of the deployable restroom 100. As shown, perimeter camera 110a may capture a live feed of the front area of the deployable restroom 100 while perimeter camera 110b may capture a live feed of the back area of the deployable restroom 100. The live feeds captured from the security perimeter cameras 110 may be used to augment the data captured by the electronic readers 104 and the face detection cameras 108. For example, the live feeds may corroborate that a particular user accessed a restroom unit 102.

Additionally, the deployable restroom 100 may include a tank area 114 accessible through a door 120. The tank area 114 (and the entire shipping container 118) may be made of steel, fiberglass, high density polyethylene (HDPE), and/or any other type of durable material. To maintain an appropriate level of environmental comfort within the restroom units 102, the deployable restroom 100 may also include an air conditioning and heating unit 112. The deployable restroom 100 may further include a freshwater utility tie or connector 121 to receive fresh water, e.g., from a municipal water supply and a wastewater utility tie or connector 122 to drain wastewater, e.g., to a municipal sewage.

FIG. 1C shows a cross section along the length of the deployable restroom 100, looking from the middle portion toward the front. In this illustrated embodiment, anti-graffiti paint 124 on the internal walls of the deployable restroom 100 are shown. The anti-graffiti paint 124 may obstruct graffiti from sticking and/or setting to the internal walls. Therefore, any kind of offensive, discriminatory, and/or racist graffiti may be avoided within the internal locations of the restroom 100. The illustrated embodiment includes sinks (e.g., a sink 126) within the restroom units 102. Additionally, the illustrated embodiment includes a freshwater storage tank 128 and a wastewater storage tank 130. The freshwater storage tank 128 may provide fresh water to the sinks and to the toilets (e.g., toilet 132 shown in FIG. 1D) for flushing. The wastewater from the sinks and/or the toilets may be collected at the wastewater storage tank 130.

FIG. 1D shows another cross section view along the length of the deployable restroom 100, looking from the middle portion toward the back. This illustrated embodiment includes a jet pump 134 that may pump fresh water from the freshwater storage tank 128 toward the restroom units 102 and/or pump wastewater from the restroom units 102 toward the wastewater storage tank 130. In one or more embodiments, however, fresh water may be gravity fed from the freshwater storage tank 128 to the restroom units 102.

Figure 1E:
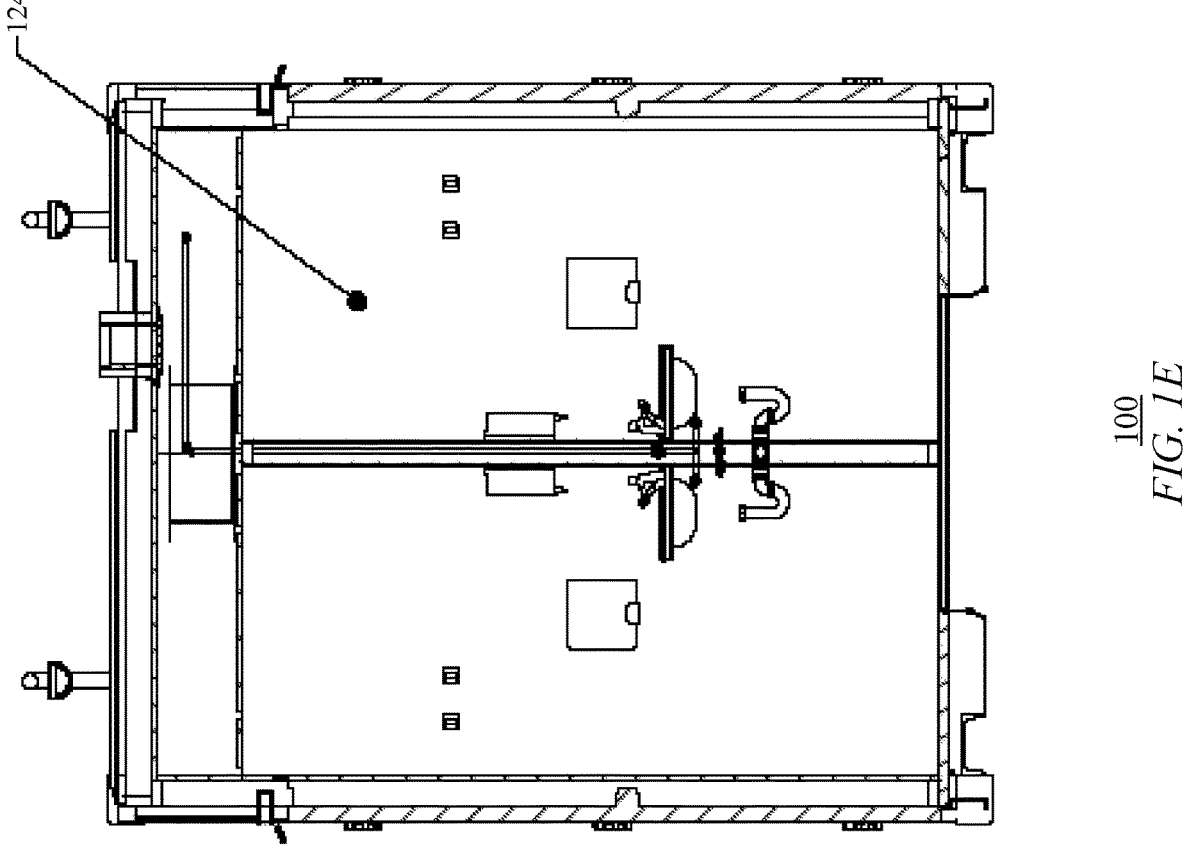
Figure 1F:
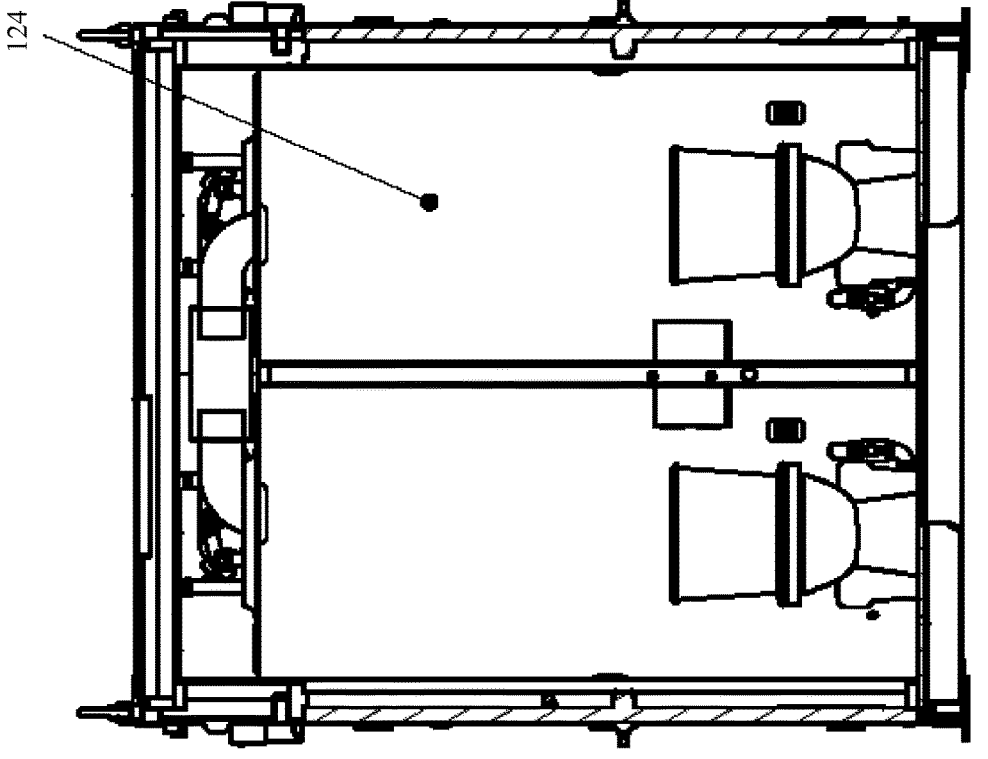
Figure 1G:
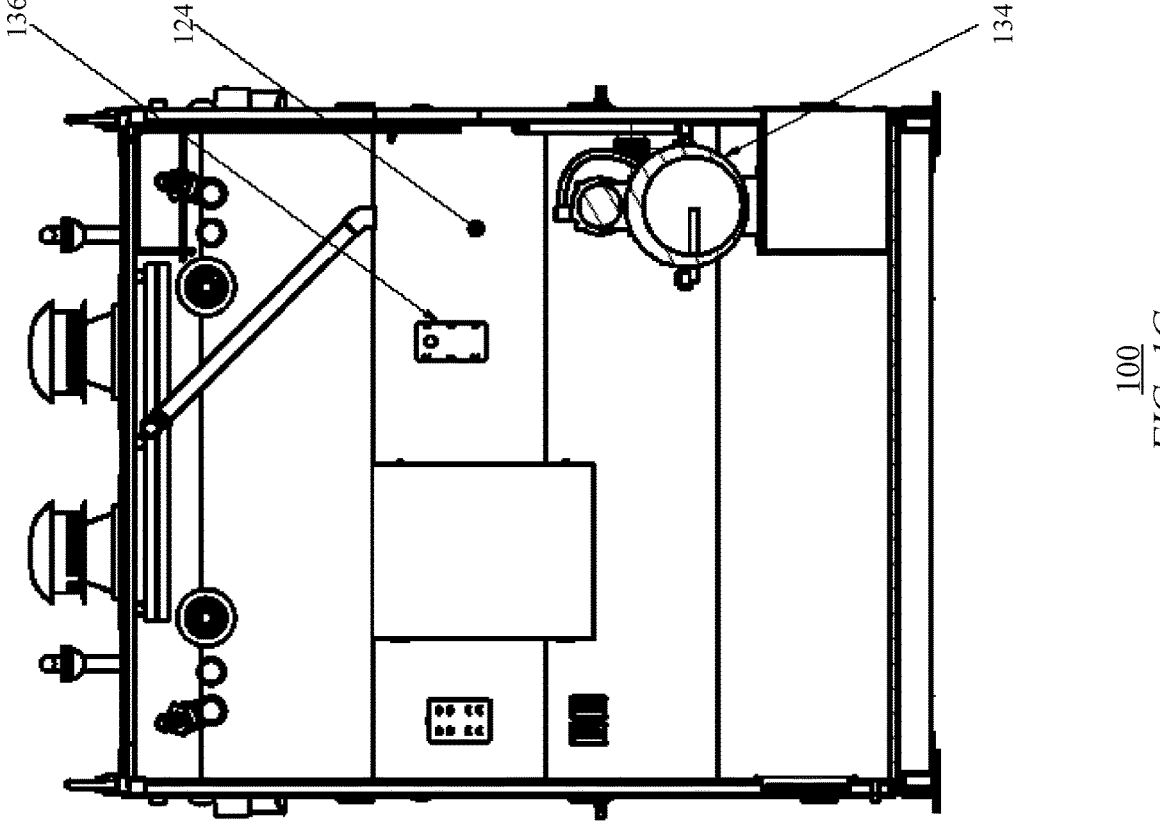
Figure 1H:
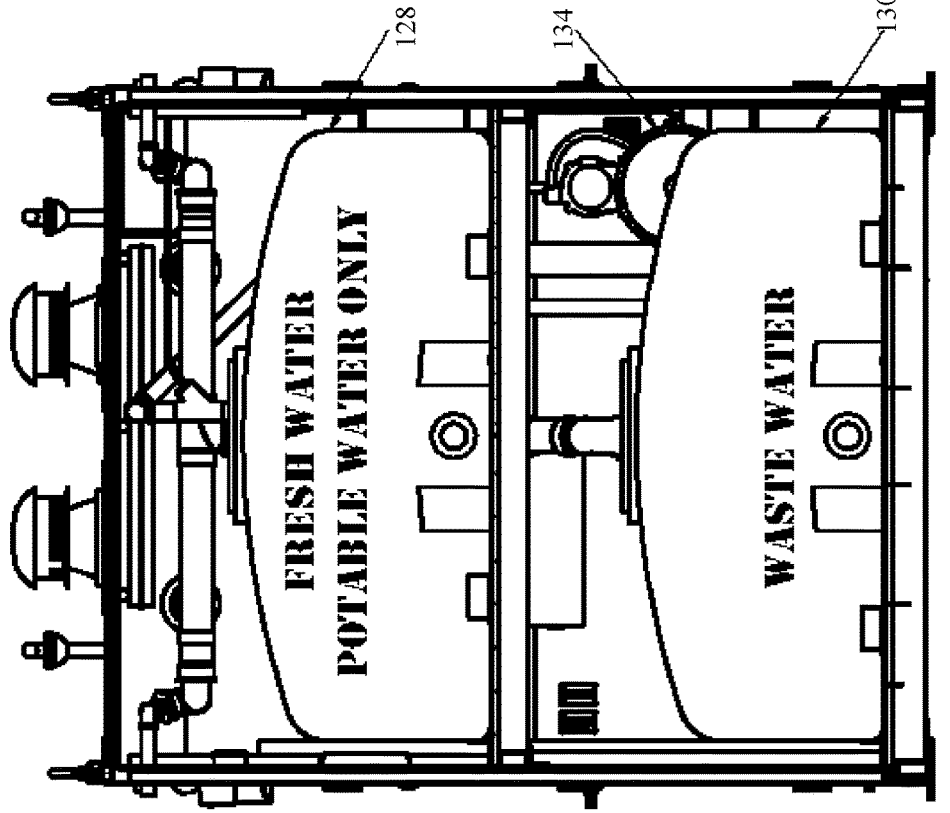
Figure 11:
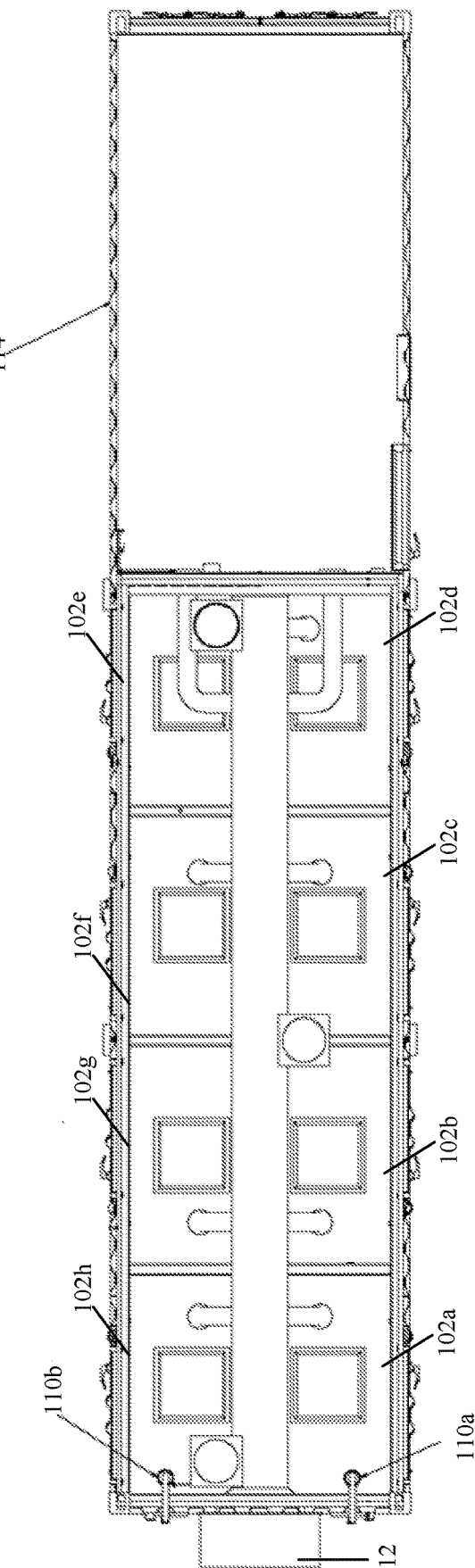

FIGS. 1E-1F show cross section views along the width of the deployable restroom 100. As shown, the internal wall is coated with anti-graffiti paint 124. FIG. 1G shows another cross section view along the width of the deployable restroom 100. The internal wall is coated with anti-graffiti paint 124. In this illustrated embodiment, a jet pump 134 and a water heater 136 are shown. The water heater 136 may be used to provided heated water to the sinks in the restroom units 102. FIG. 1H another cross section view along the width of the deployable restroom 100 showing the freshwater tank 128, wastewater tank 130, and the jet pump 134. FIG. 1I shows a top view of the deployable restroom 100 with the eight restroom units 102a-102h.

Figure 2:
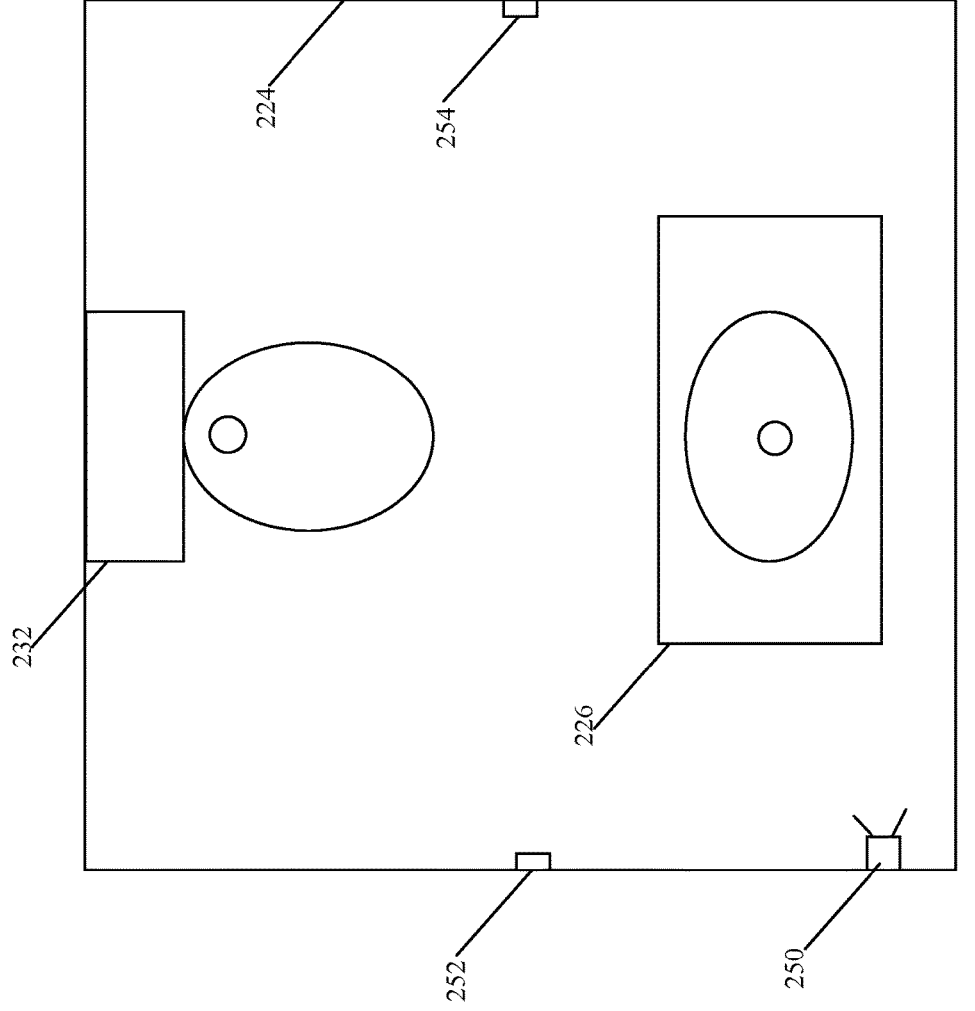
FIG. 2 shows a schematic diagram of an internal area of a restroom unit, based on the principles disclosed herein.

FIG. 2 shows a schematic diagram of an internal area of a restroom unit 202, based on the principles disclosed herein. The restroom unit 202 may be similar to the restroom units 102 described in reference to FIGS. 1A-1I above. It should also be understood that the shown internal area is just an example, and restroom units with other types of internal areas should be considered within the scope of this disclosure.

As shown, the internal area may include a toilet 232 and a sink 226. To monitor the internal area, a camera 250 may be provided. The camera 250 may be configured to operate in a privacy preserving manner. For instance, the camera 250 may not take pictures when a user is present. To aid the camera 250, a proximity sensor 252 and/or a motion sensor 254 may be provided. One or more of the proximity sensor 252 or the motion sensor 254 may indicate that there is no user in the restroom, and the camera 250 may take a picture in response to the indication.

In one or more embodiments, the camera 250 may take an initial picture when a user is authorized to enter the restroom unit 202, but the user has not yet entered the restroom unit 202. For instance, an unlocking action of the door of the restroom unit 202 may trigger the camera 250 to take the initial picture. The camera 250 may take a final picture when the user has exited the restroom unit 202. The user's exit may be indicated by a manual unlocking of the door, measurement from the proximity sensor 252, and/or measurement from the motion sensor 254. The initial and the final pictures may then be compared to determine if the user engaged in vandalism. As an extra measure against vandalism, the internal walls of the restroom unit 202 may be covered in anti-graffiti paint 224.

In one or more embodiments, the motion sensor 254 and/or the proximity sensor 252 may be used to detect an emergency. For example, if one or more these sensors detect non-movement after a period of occupation and there has been no detection of the user exiting the restroom unit 202, a potential emergency may be determined, and an indication may be provided to one or more personnel on the site.

Figure 3:
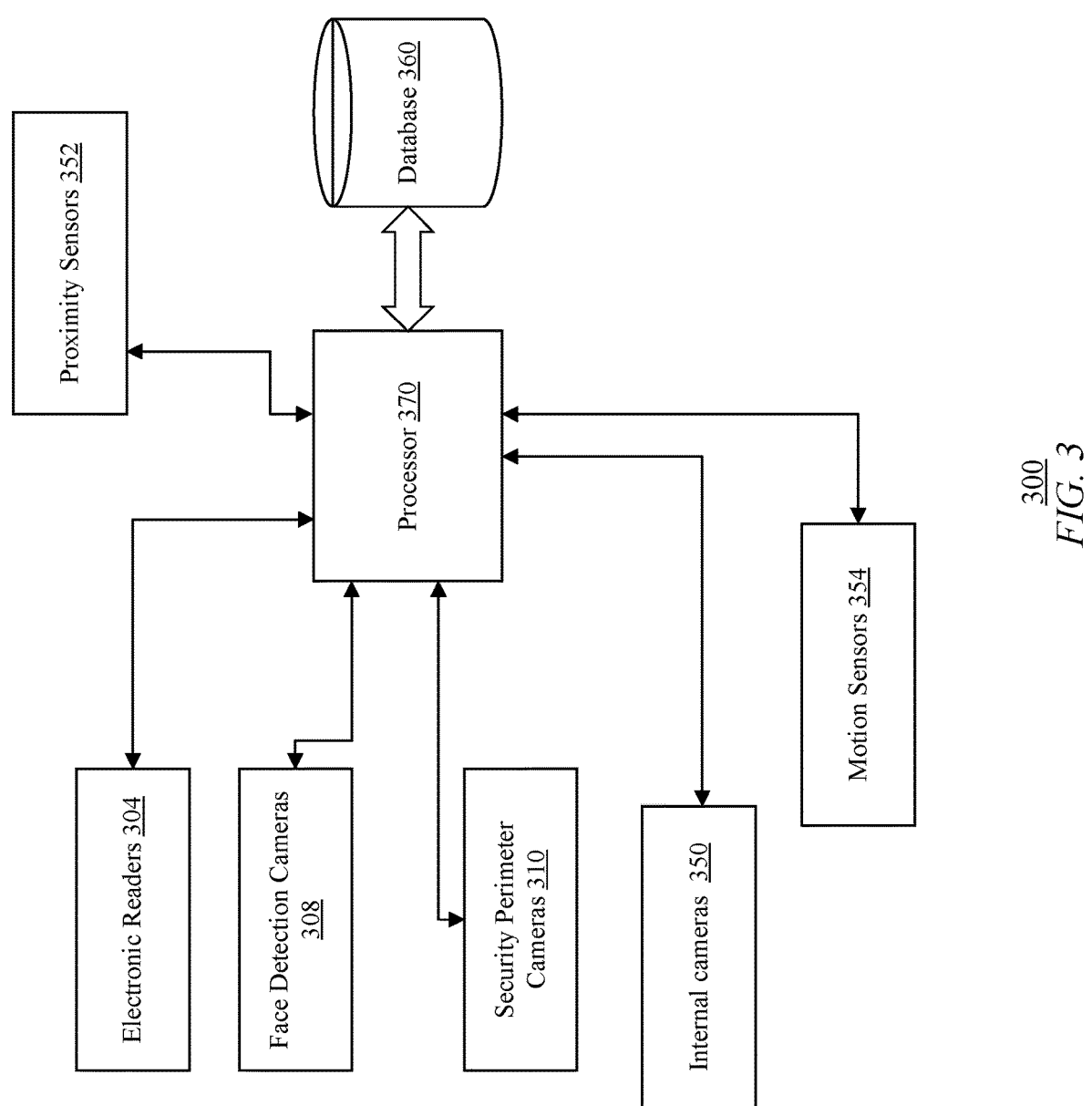
FIG. 3 shows an example architecture configured to mitigate vandalism in deployable restrooms, based on the principles disclosed herein.

FIG. 3 shows an example architecture 300 configured to mitigate vandalism in deployable restrooms, based on the principles disclosed herein. It is to be understood that the architecture 300 and its components are just presented as examples and should not be considered limiting. That is, architectures with additional, alternative, or fewer number of components should also be considered within the scope of this disclosure.

As shown, the architecture 300 may include a processor 370, a database 360, electronic readers 304, face detection cameras 308, security perimeter cameras 310, internal cameras 350, proximity sensors 352, and motion sensors 354. Using these components, an accurate access log of the restroom may be maintained such that persons involved in vandalism such as offensive graffiti may be apprehended, while preserving the privacy of restroom use.

The processor 370 can be any type of processor. Non-limiting examples of the processor 370 may include a controller, a microprocessor, a central processing unit (CPU), a field programmable gate array (FPGA), and/or the like. In one or more embodiments, the processor 370 may be programmable. The processor 370 is generally configured to—e.g., through programming—to receive data from the various sensors within the deployable restroom, and, based on the received data, maintain an access log of the deployable restroom in the database 360.

The database 360 may include any kind of database that the processor 370 may access to maintain the access log. In one or more embodiments, the database 360 may store computer programs executable by the processor 370. The database may include relational database, object oriented database, and/or database of any configuration.

Although the processor 370 and the database 360 are shown as single and connected components, it should be understood that the processor 370 may include multiple processors and the database 360 may include multiple databases. In one or more embodiments, the processor 370 and the database 360 may be remote from the deployable restroom and the sensors and the sensor data may be transmitted/received through a wide area network such as the Internet. In one or more embodiments, the processor 370 and the database 360 may be local to the sensors. The sensor data in these cases may be transmitted/received through wired connections or wirelessly. Therefore, any remote or local configuration of the processor 370, database 360, and the sensors should be considered within the scope of this disclosure.

The electronic readers 304 may include any type of electronic readers. The electronic readers 304 may be similar to electronic readers 104 described with respect to FIGS. 1A-1I. Non-limiting examples of the electronic readers 304 include swipe readers that read information from a magnetic strip of a swiped card; NFC readers that electromagnetically read information from a card that is brought close by; optical electronic readers that may optically read a barcode, QR code, and/or any other type of two-dimensional code; readers that may interact with a smartphone, e.g., through Bluetooth, NFC, etc.; and/or the like. The electronic readers 304 may read identification information of a user engaging his/her card and/or an electronic device with the electronic readers 304 and transmit the information to the processor 370. The processor 370 may in turn authorize the user, e.g., by accessing the database 360, and actuating a lock to unlock a restroom unit's door for the user to enter. Additionally, the electronic readers 304 may transmit the time stamp of the engagement of a user card or an electronic device with the electronic readers 304 such that a record may be maintained in the database 360.

The face detection cameras 308, which may be similar to face detection cameras 108 described in FIGS. 1A-1I, may transmit a detected user face to the processor 370. The processor 370 in turn compares the received face with user faces stored in the database 360. If there is a match, the processor 370 may actuate a lock to unlock the restroom unit's door. Additionally, the processor 370 may store the timestamp of the detected user face to the database 360.

The security perimeter cameras 310, which may be similar to security perimeter cameras 110 described in reference in FIGS. 1A-1I, may provide continuous or semi-continuous feed of the surroundings of the deployable restroom. The processor 370 may use the feed to augment (e.g., confirm) the detection of particular users by the electronic readers 304 and/or the face detection cameras 308. The processor 370 may store the received feed in the database 360.

The internal cameras 350, which may be similar to the internal camera 250 described in reference in FIG. 2, may provide images of the internal area of a restroom unit before a user uses a restroom and after the user has used the restroom. The processor 370 may perform a comparison to determine if the user has vandalized the internal area of the restroom. Additionally, the processor 370 may store the received images and/or the above determination in the database 360.

The motion sensors 354, which may be analogous to the motion sensors 254 described in reference to FIG. 2, may transmit motion detection instances within an internal area of a restroom unit to the processor 370. The processor 370 may use the motion detection instances to determine whether there is a user in the restroom unit.

The proximity sensors 352, which may be analogous to the proximity sensors 252 described in reference to FIG. 2, may transmit proximity detection instances within an internal area of a restroom unit to the processor 370. The processor 370 may use the proximity detection instances to determine whether there is a user in the restroom unit.

FIG. 4 is a flowchart of an example method 400 of mitigating vandalism in a deployable restroom, based on the principles disclosed herein. It should be understood that the steps of the method 400 are merely presented as example and should not be considered limiting. That is, methods with additional, alternative, or fewer number of steps should be considered within the scope of this disclosure.

The method may begin at step 410, where a face detection camera on a restroom unit of the restroom may detect a user's face. The user may be approaching the restroom unit when his/her face is detected.

At step 420, an electronic reader on the restroom unit may read identification information of the user. The identification information may be read from the user's identification card (e.g., through a swipe or a tap) or the user's electronic device (e.g., through Bluetooth or NFC).

At step 430, at least one of the face detection camera or the electronic reader may trigger an actuator to unlock the restroom unit responsive to determining that the user is authorized to use the restroom unit. The authorized user may then enter the unlocked restroom unit.

At step 440, at least one of the face detection camera or the electronic reader may transmit an indication that that the user has used the restroom unit with corresponding timestamps to a processor such that a record of the restroom unit access is maintained to deter vandalism. The user, knowing that an accurate log of his/her restroom access is maintained, may choose to not engage in vandalism such as painting a racist graffiti.

Figure 5:
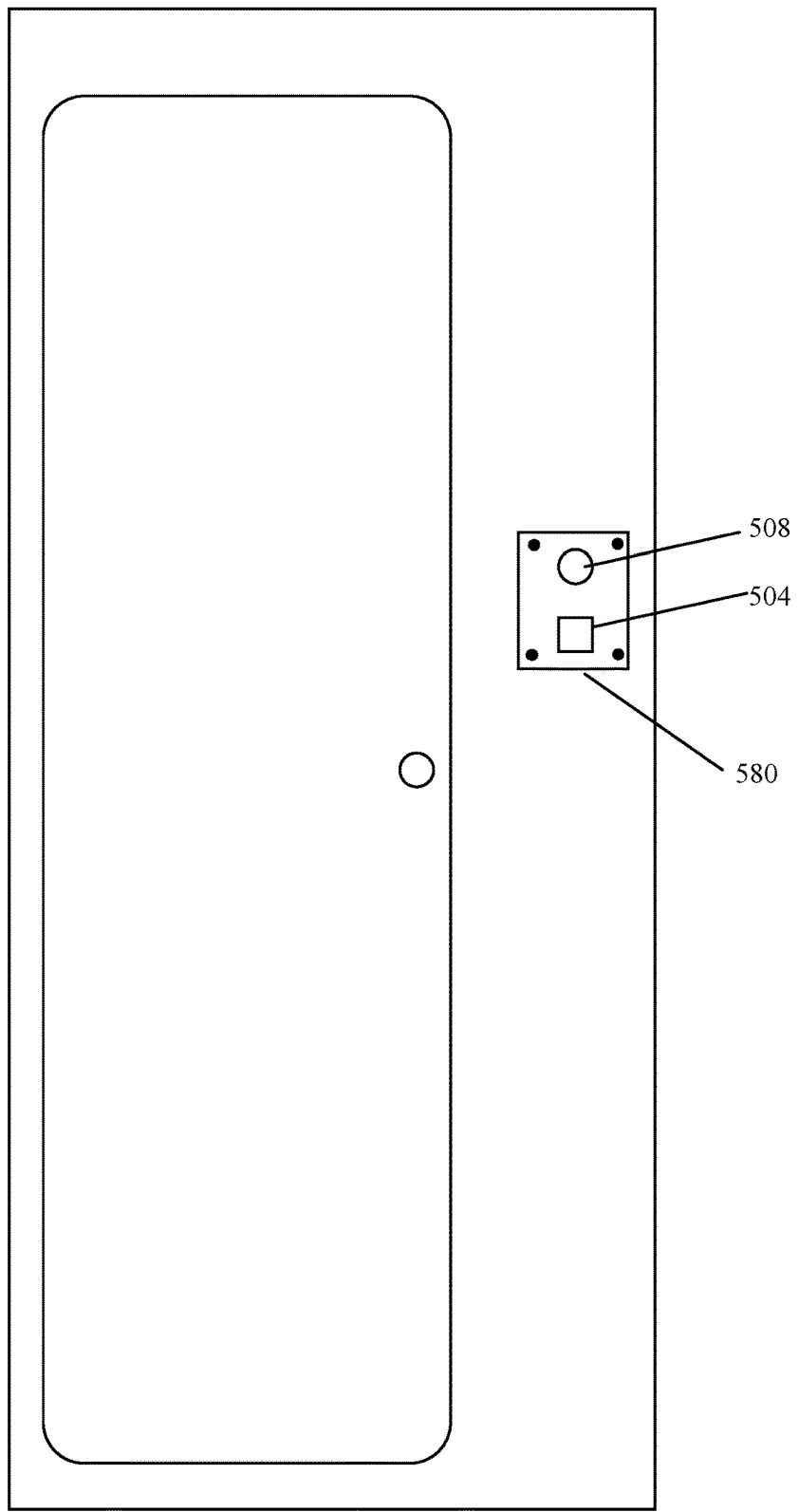
FIG. 5 shows an example deployable restroom, based on the principles disclosed herein.

FIG. 5 shows an example deployable restroom 500, based on the principles disclosed herein. As shown, the deployable restroom 500 may be a porta-potty type unit with an attached anti-vandalism panel 580. The anti-vandalism panel 580 may be attached to the deployable restroom 500 through bolting, gluing, welding, and/or any other type of attachment mechanism.

The anti-vandalism panel 580 may include an electronic reader 504 and/or a face detection camera 508. The electronic reader 504 may electronically read identification information of a user, e.g., information on a card or on an electronic device. The face detection camera 508 may detect the face of the user. The identification information and/or the detected face may be used to authorize the user to enter the restroom 500. Additionally, the electronic reader 504 and/or face detection camera 508 may generate and store (either locally or remotely) timestamps of the user's access of the restroom 500.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(*f*).

What is claimed is:

1. A deployable, user-accountable anti-vandalism restroom comprising:
  a cluster of individually accessible restroom units, a restroom unit comprising:
    a face detection camera; and
    an electronic reader;
  the face detection camera configured to detect a particular user's face;
  the electronic reader configured to read an identification information of the particular user;
  at least one of the face detection camera or the electronic reader further configured to:
    trigger an actuator to unlock the restroom unit responsive to determining that the particular user is authorized to use the restroom unit based on the identification information or face detection information, the determination based on matching the identification information with a stored identification information of the particular user or based on matching the face detection information with a stored face detection information of the particular user; and
  transmit an indication that the particular user has used the restroom unit with corresponding timestamps to a processor such that a record of the restroom unit access is maintained to deter vandalism; and
  an internal camera configured to capture a first image before the particular user uses the restroom unit and a second image after the particular user has used the restroom unit, such that the processor compares the first image and the second image to determine vandalism.

2. The restroom of claim 1, further comprising:
  at least one security perimeter camera configured to capture images an area surrounding the restroom.

3. The restroom of claim 1, the electronic reader comprising a card reader configured to read the identification information from a card associated with the particular user.

4. The restroom of claim 3, the card reader being at least one of a swipe card reader, near field communication reader, or an optical bar code reader.

5. The restroom of claim 1, the electronic reader being configured to read the identification information from an electronic device associated with the particular user.

6. The restroom of claim 1, the restroom unit further comprising:
  a motion sensor configured to detect a presence of the particular user in the restroom unit.

7. The restroom of claim 1, the restroom unit further comprising:
  a proximity sensor configured to detect a presence of the particular user in the restroom unit.

8. The restroom of claim 1, wherein the restroom unit comprises an interior wall with anti-graffiti paint.

9. The restroom of claim 1, the processor being remote from the restroom or being local to the restroom.

10. A method to mitigate vandalism in a user-accountable deployable restroom, the method comprising:
  detecting, by a face detection camera on a restroom unit of the restroom, a particular user's face;
  reading, by an electronic reader on the restroom unit, an identification information of the particular user;
  triggering, by at least one of the face detection camera or the electronic reader, an actuator to unlock the restroom unit responsive to determining that the particular user is authorized to use the restroom unit, the determination based on matching the identification information with a stored identification information of the particular user or based on matching the face detection information with a stored face detection information of the particular user;
  transmitting, by at least one of the face detection camera or the electronic reader, an indication that the particular user has used the restroom unit with corresponding timestamps to a processor such that a record of the restroom unit access is maintained to deter vandalism; and
  capturing, by an internal camera of the restroom unit, a first image before the particular user uses the restroom unit and a second image after the particular user has used the restroom unit, such that the processor compares the first image and the second image to determine vandalism.

11. The method of claim 10, further comprising:
  capturing, by a security perimeter camera of the restroom, images an area surrounding the restroom.

12. The method of claim 10, the electronic reader comprising a card reader, the method further comprising:

reading, by the card reader, the identification information from a card associated with the particular user.

13. The method of claim 12, the card reader being at least one of a swipe card reader, near field communication reader, or an optical bar code reader.

14. The method of claim 10, further comprising:

reading, by the electronic reader, the identification information from an electronic device associated with the particular user.

15. The method of claim 10, further comprising:

detecting, by a motion sensor of the restroom unit, a presence of the particular user in the restroom unit.

16. The method of claim 10, further comprising:

detecting, by a proximity sensor of the restroom unit, a presence of the particular user in the restroom unit.

17. The method of claim 10, the restroom unit comprising an interior wall with anti-graffiti paint.

18. The method of claim 10, the processor being remote from the restroom or being local to the restroom.

19. A deployable, user-accountable restroom comprising:

a restroom unit comprising:

a face detection camera configured to:

detect a particular user's face and generate a face detection information;

trigger an actuator to unlock the restroom unit responsive to determining that the particular user is authorized to use the restroom unit based on the face detection information, the determination based on matching the face detection information with a stored face detection information of the particular user; and transmit an indication that the particular user has used the restroom unit with corresponding timestamps to a processor such that a record of the restroom unit access is maintained to deter vandalism; and an internal camera configured to capture a first image before the particular user uses the restroom unit and a second image after the particular user has used the restroom unit, such that a processor compares the first image and the second image to determine vandalism.

20. A deployable, user-accountable restroom comprising:

a restroom unit comprising:

an electronic reader configured to:

read an identification information of a particular user;

trigger an actuator to unlock the restroom unit responsive to determining that the particular user is authorized to use the restroom unit based on the identification information the determination based on matching the identification information with a stored identification information of the particular user; and transmit an indication that the particular user has used the restroom unit with corresponding timestamps to a processor such that a record of the restroom unit access is maintained to deter vandalism; and an internal camera configured to capture a first image before the particular user uses the restroom unit and a second image after the particular user has used the restroom unit, such that a processor compares the first image and the second image to determine vandalism.

* * * * *